US008794387B2

(12) United States Patent
Göser

(10) Patent No.: US 8,794,387 B2
(45) **Date of Patent: *Aug. 5, 2014**

(54) TRACTION SYSTEM AND AN ELEVATOR ARRANGEMENT INCORPORATING SAID TRACTION SYSTEM

(75) Inventor: Hubert Göser, Dannenberg (DE)

(73) Assignee: ContiTech Antriebssysteme GmbH, Hannover (DE)

(*) Notice: Subject to any disclaimer, the term of this patent is extended or adjusted under 35 U.S.C. 154(b) by 188 days.

This patent is subject to a terminal disclaimer.

(21) Appl. No.: 13/104,530

(22) Filed: May 10, 2011

(65) Prior Publication Data

US 2011/0226562 A1 Sep. 22, 2011

Related U.S. Application Data

(63) Continuation of application No. PCT/EP2009/062503, filed on Sep. 28, 2009.

(30) Foreign Application Priority Data

Nov. 10, 2008 (DE) ......................... 10 2008 037 538

(51) Int. Cl.

| | |
|---|---|
| ***B66B 7/06*** | (2006.01) |
| ***B66B 11/08*** | (2006.01) |
| ***D07B 1/22*** | (2006.01) |
| ***F16G 1/16*** | (2006.01) |
| ***F16G 1/28*** | (2006.01) |
| ***F16G 5/20*** | (2006.01) |

(52) U.S. Cl.
USPC ........... 187/255; 187/254; 474/203; 474/205; 474/252; 474/260

(58) Field of Classification Search
CPC .............. B66B 7/062; F16G 1/28; F16G 1/16
USPC .......... 187/251, 254, 255; 474/203, 204, 205, 474/238, 260
IPC ..... B66B 7/06,11/08, 15/02, 15/04; F16G 1/28, F16G 1/16, 5/06, 5/20; D07B 1/16, 1/22
See application file for complete search history.

(56) References Cited

U.S. PATENT DOCUMENTS 826,899 A * 7/1906 Smallbone .................... 474/204
1,121,987 A * 12/1914 Diehl ............................ 474/205
(Continued)

FOREIGN PATENT DOCUMENTS

DE 3411772 A1 * 5/1985 ................ F16G 1/28
DE 102008018191 A1 * 10/2009 ................ B66B 7/08
(Continued)

OTHER PUBLICATIONS

EPO Machine Translation, DE3411772, Jun. 5, 2012, pp. 1-3.*
(Continued)

*Primary Examiner* — William A Rivera
*Assistant Examiner* — Stefan Kruer
(74) *Attorney, Agent, or Firm* — Walter Ottesen P.A.

(57) ABSTRACT

A traction system includes a composite rope (1), especially for an elevator. The composite rope (1) is driveable by a traction sheave (6). The traction system has a composite rope that is easy to handle, whereby high traction forces can be transferred, and the composite rope enables a narrower drive unit than known belt technology. To this end, the composite rope has parallel individual tension members (4) surrounded by an elastomer material which are interconnected by an elastomer connecting layer (5) on one side, and the tension members (4) engage in corresponding grooves (7) of the traction sheave (6). The penetration depth of the individual ropes (2) of the tension members (4) in the grooves of the traction sheave (6) is at least 25% of the diameter (d) of the individual ropes (2).

21 Claims, 3 Drawing Sheets

(56) References Cited

U.S. PATENT DOCUMENTS

| | | | | |
|---|---|---|---|---|
| 3,580,767 | A * | 5/1971 | Barnes et al. | 156/138 |
| 3,673,883 | A * | 7/1972 | Adams | 474/205 |
| 3,977,265 | A * | 8/1976 | Worley et al. | 474/153 |
| 4,151,755 | A * | 5/1979 | Allaben, Jr. | 474/261 |
| 4,214,488 | A * | 7/1980 | Conrad | 474/148 |
| 4,215,590 | A * | 8/1980 | Bahiman | 474/207 |
| 4,445,879 | A * | 5/1984 | Cicognani | 474/205 |
| 6,371,448 | B1 * | 4/2002 | De Angelis | 254/374 |
| 6,508,051 | B1 * | 1/2003 | De Angelis | 57/223 |
| 6,739,433 | B1 | 5/2004 | Baranda et al. | |
| 7,757,817 | B2 | 7/2010 | Ach | |
| 7,770,328 | B2 | 8/2010 | Vanderbeken et al. | |
| 8,057,344 | B2 * | 11/2011 | Wu | 474/260 |
| 2004/0256180 | A1 | 12/2004 | Eichhorn et al. | |
| 2004/0262087 | A1 * | 12/2004 | Ach | 187/264 |
| 2010/0044158 | A1 | 2/2010 | Goeser | |
| 2010/0133046 | A1 * | 6/2010 | Allwardt et al. | 187/251 |
| 2011/0240408 | A1 * | 10/2011 | Wesson et al. | 187/251 |

FOREIGN PATENT DOCUMENTS

| | | | | |
|---|---|---|---|---|
| DE | 102008037541 | A1 * | 10/2009 | D07B 1/22 |
| DE | 102008037537 | A1 * | 5/2010 | B66B 7/12 |
| EP | 1 396 458 | A2 | 3/2004 | |
| EP | 1 746 061 | A1 | 1/2007 | |
| JP | 2004218099 | A * | 8/2004 | D07B 1/16 |
| WO | WO 2009050182 | A2 * | 4/2009 | B66B 7/06 |

OTHER PUBLICATIONS

International Search Report dated Dec. 1, 2009 of international application PCT/EP 2009/062503 on which this application is based.

* cited by examiner

TRACTION SYSTEM AND AN ELEVATOR ARRANGEMENT INCORPORATING SAID TRACTION SYSTEM

CROSS REFERENCE TO RELATED APPLICATIONS

This application is a continuation application of international patent application PCT/EP 2009/062503, filed Sep. 28, 2009, designating the United States and claiming priority from German application 10 2008 037 538.1, filed Nov. 10, 2008, and the entire content of both applications is incorporated herein by reference.

FIELD OF THE INVENTION

The invention relates to a traction system, especially for an elevator, the traction system including at least the following components, namely, at least one pulling means and at least one traction sheave. The invention also relates to an elevator arrangement incorporating the traction system.

BACKGROUND OF THE INVENTION

Traction systems for lifts or elevators are known per se. Ropes, but also belts, are frequently used as pulling means, with both flat belts and V-ribbed belts or even toothed belts being used as belts.

Where ropes are used as pulling means, each individual rope is clearly assigned a dedicated rope groove on the traction sheave. In this arrangement, each rope penetrates with at least part of the diameter thereof into the associated rope groove.

Each individual rope is an independent tension element and can also be operated individually. For higher power requirements, it is possible to use either a plurality of ropes in parallel or for the rope diameter to be increased accordingly. The individual rope is thus not only a pulling means for transmitting the pulling forces but also participates directly in the transmission of the traction forces.

Compared with belt systems, ropes afford the advantage that the force can be transmitted directly from the traction sheave to the ropes. In the case of belt systems, there is, in addition, the connecting elastomer material between the actual tension members and the traction sheave.

Where belts are used, a plurality of adjacent ropes as tension elements is always embedded in a common belt body. Here, the tension elements are completely encased by the base material of the belt body, and the plane of the tension elements is above the contact plane formed by the belt with the corresponding belt sheave, it being possible to consider the belt toothing as the contact plane in the case of toothed belts, the plane of the V as the contact plane in the case of V ribs, and the flat belt surface itself as the contact plane in the case of flat belts.

The tension elements are thus exclusively responsible for transmitting the pulling forces. For higher power requirements, wider belts or belts belonging to a higher power category with a larger belt pitch and stronger tension elements can be used.

Fundamentally, the width of the belts is significantly greater than the height thereof in order to ensure that they run in a stable manner on the sheave.

EP 1 396 458 A2 describes an elevator device in which a flat belt made of elastomer material reinforced with strength members is used as a pulling means. U.S. Pat. No. 7,757,817 B2 shows an elevator having a V-ribbed belt.

Compared with ropes, belts offer the advantage, on the one hand, that handling is simpler since it is not necessary to lay individual ropes onto corresponding grooves of the traction sheave and that even small traction sheave diameters can be employed without problems since the embedded tension members generally have relatively small diameters. Moreover, belts as pulling means are virtually maintenance-free since no lubrication is required.

However, the force that can be transmitted is dependent not only on the friction between the traction sheave and the elastomer but also on how well the tension members are embedded in the elastomer, that is, on the adhesion between the elastomer and the tension member and on the shear strength of the elastomer.

Moreover, at least two and, in general, three to five belts must always be used in parallel in lifts, for example, for safety reasons. The fact that the belts contain a large number of thin individual ropes makes them relatively wide in comparison with a rope of the same strength. If a plurality of belts is now used in parallel, relatively wide traction sheaves and deflection sheaves are required.

U.S. Pat. No. 6,739,433 discloses a tension member for an elevator which is designed as a profiled flat belt, thus somewhat increasing the size of the surface available for friction between the traction sheave and the belt. The force that can be transmitted is thus somewhat greater than in the case of an unprofiled flat belt but, here too, the zone of force transmission between the traction sheave and the pulling means is still a significant distance from the tension members, with the result that the elastomer material of the flat belt is subjected to relatively severe shear stress.

SUMMARY OF THE INVENTION

It is an object of the invention to provide a traction system of the type described above which is simple to handle, in which high pulling forces can be transmitted and in which the pulling means allows the use of a drive unit of narrower construction than that in the known belt systems.

This object is achieved by virtue of the fact that the pulling means of the traction system is designed as a composite rope, in which parallel individual ropes having a first diameter are each jacketed with an elastomer jacket layer of a predetermined thickness so as to provide tension members, each having an overall diameter, and the tension members are connected to one another substantially over the entire length thereof by an elastomer connecting layer on one side, wherein the elastomer connecting layer is arranged on the side of the tension members which faces away from the side which engages in the grooves of the traction sheave, and the tension members engage in corresponding grooves of the traction sheave in such a way that the penetration depth of the individual ropes of the tension members into the grooves of the traction sheave is at least 25% of the diameter of the individual ropes.

By means of this arrangement, it is possible to combine the advantages of belt systems with those of rope systems. Thus, the composite rope is simple to handle and is almost maintenance free, like a belt. Owing to the fact that the tension members engage directly in the grooves of the traction sheave, at least the vertex of each tension member, which is closest to the traction sheave, comes into contact with the traction sheave. The zone of force transmission between the traction sheave and the pulling means is directly in the zone of engagement, thereby ensuring high force transmission. Owing to the small thickness of the jacket, the shear strength thereof is of only very minor significance.

It is possible to use thin ropes, thus enabling small traction sheave diameters and narrow traction sheaves to be used. For each composite rope, just one connecting element is required for attachment to the elements which are, for example, to be lifted.

According to an embodiment of the invention, the thickness of the jacket of the individual ropes is in a range of from 0.2-2 mm.

In a preferred embodiment of the invention, the thickness of the jacket of the individual ropes is in a range of from 0.5-1 mm.

With these small thicknesses for the jacket, the jacket is subjected to particularly low shear stress, and the pulling force that can be transmitted is correspondingly high.

According to an embodiment of the invention, the diameter of the individual ropes is between 1.5 mm and 8 mm.

According to an embodiment of the invention, the diameter of the individual ropes is between 1.8 mm and 5.5 mm.

In this diameter range, the relationship between a minimum traction sheave diameter and high bearing load is particularly good.

According to an embodiment of the invention, the ratio of the diameter d of the individual ropes to the thickness u of the jacket d/u is greater than or equal to 3.

Here, the thickness of the jacket relative to the diameter of the individual ropes is so small that the properties of the jacket play a particularly small role.

According to an embodiment of the invention, the jacket is formed from an elastomer which differs from the elastomer of the connecting layer.

By using elastomers of different types, it is possible to employ a particularly wide variety of combinations of material, thus enabling the composite rope to be adapted individually to a large number of applications.

According to an embodiment of the invention, the elastomer or the elastomers is or are preferably a polyurethane or polyurethanes.

Polyurethane has both good friction and good adhesion properties and is relatively insensitive to shear.

According to an embodiment of the invention, the jacket of the individual ropes has an outer contour facing the traction sheave, the cross section of which is designed so that it deviates from the shape of a partial circle.

According to an embodiment of the invention, the cross section of the outer contour is of trapezoidal design.

According to an embodiment of the invention, the cross section of the outer contour is of square design.

According to an embodiment of the invention, the cross section of the outer contour is of conical design.

Adopting different geometries for the cross sections of the jacket has the advantage that the composite rope can thus be adapted to a large number of traction sheave profiles.

In another embodiment of the invention, the connecting layer has a profiled surface on the side thereof which faces away from the traction sheave.

This profiling serves to improve the guidance of the composite ropes when they have to be guided around direction-changing rollers by way of the back of the composite ropes.

In another embodiment of the invention, each composite rope has at least four individual ropes.

This improves protection against twisting of the composite ropes, thus ensuring that they run reliably into the zone of engagement of the traction sheave.

According to an embodiment of the invention, the individual ropes are arranged alternately with an S-lay and a Z-lay.

In another embodiment of the invention, there is an even number of individual ropes per composite rope.

Using ropes alternately with a Z-lay and an S-lay reduces the risk of load-dependent twisting to a particularly low level. The even number improves this effect.

In another embodiment of the invention, the individual ropes are composed of steel.

Steel combines high tensile strength and reverse bending strength with good adhesion to elastomers.

The object is furthermore achieved by providing an elevator arrangement incorporating an elevator and the traction system of the invention.

An elevator arrangement of this kind affords the advantage on the one hand, that assembly is easier owing to the ease of handling of the composite ropes according to the invention and, on the other hand, that a wide tension drum is not needed.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
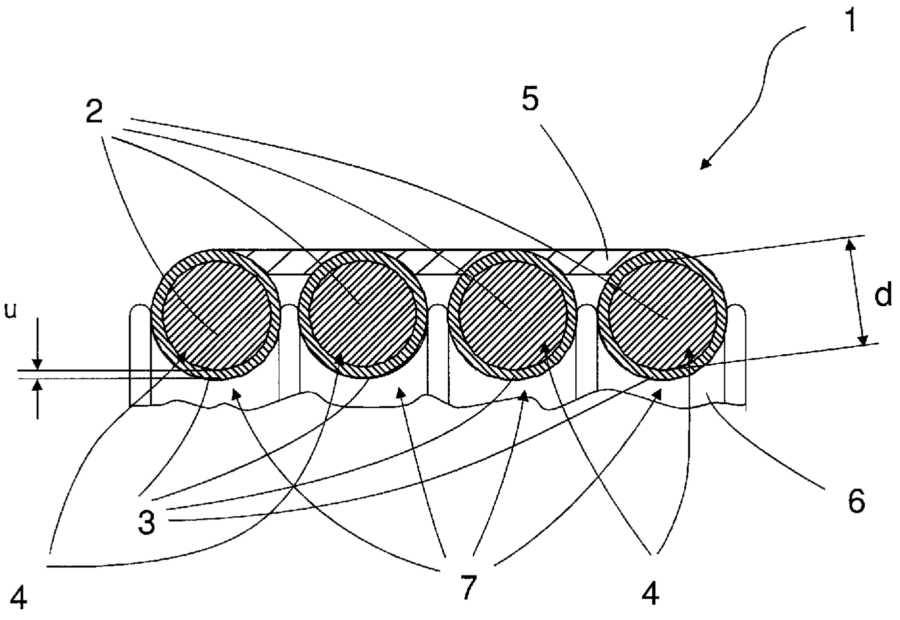
FIG. 1 shows a cross section through a composite rope of a traction system according to the invention.

The composite rope 1 shown in cross section in FIG. 1 has four individual ropes 2 having a diameter (d), which are each encased with a jacket 3 having a thickness (u) composed of an elastomer to yield tension members 4.

The tension members 4 are tightly connected to one another by a connecting layer 5 on one side, the connection being produced by vulcanizing the elastomer jacket 3 to the connecting layer 5 and the individual ropes 2. The composite rope 1 rests on a traction sheave 6, the tension members 4 engaging in grooves 7 of the traction sheave 6. The connecting layer 5 is arranged on the side of the tension members 4 which faces away from the traction sheave 6.

The tension members 4 engage in the grooves 7 of the traction sheave 6 in such a way that the individual ropes 2 of the tension members 4 penetrate by approximately 50% of the diameter of the individual ropes into the grooves 7.

Figure 2:
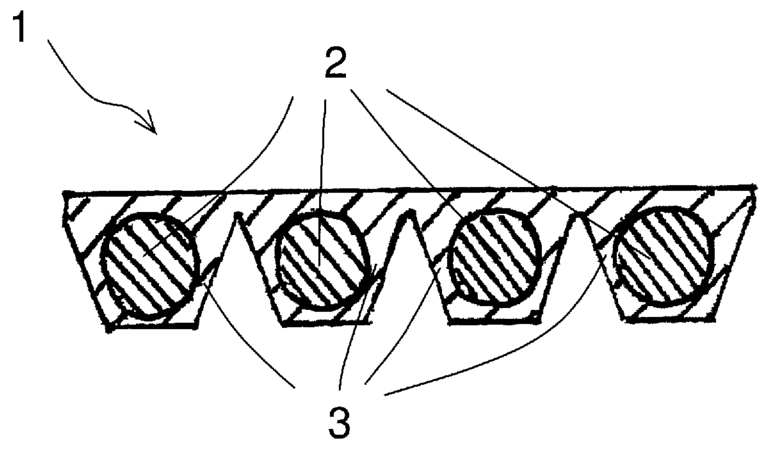
FIGS. 2 to 4 show composite ropes with different cross-sectional shapes for the jacket of the individual ropes; and, FIG. 5 shows a composite rope with a ribbed profile arranged on the rear.
Figure 3:
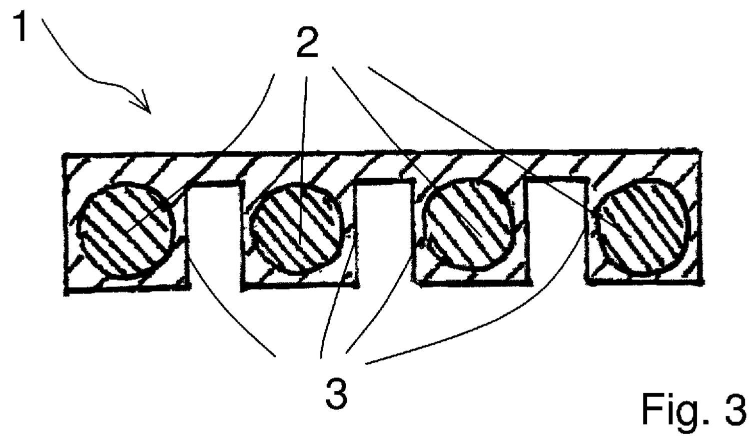
Figure 4:
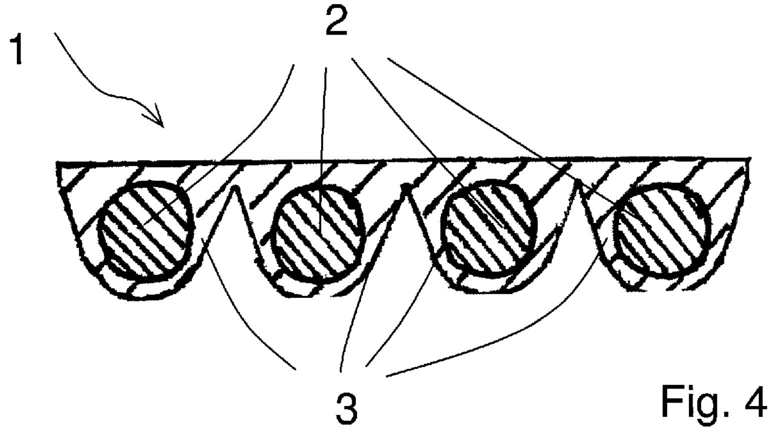

FIGS. 2, 3 and 4 show composite ropes 1, the jacket 3 of the individual ropes 2 of which has a geometry that departs from the form of a circle. These geometries improve the engagement of the composite ropes 1 in traction sheaves (not shown here) which have a profile that departs from a round shape. Thus, appropriately designed composite ropes 1 can also be employed on traction sheaves for V-ribbed belts, if required.

Figure 5:
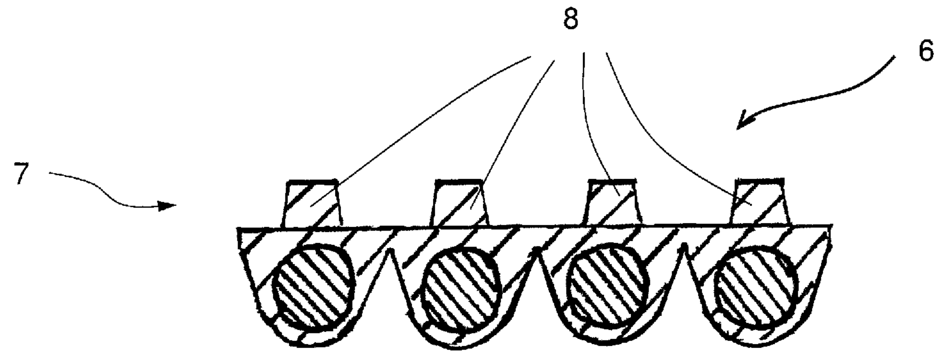

FIG. 5 shows a composite rope 8 which has a ribbed profile 9 consisting of mutually spaced longitudinal ribs 10 on a rear side facing away from a traction sheave (not shown here). If required, the longitudinal ribs can engage in corresponding direction-changing rollers (not shown here) and in this way improve the guidance of the composite rope 8.

It is understood that the foregoing description is that of the preferred embodiments of the invention and that various changes and modifications may be made thereto without departing from the spirit and scope of the invention as defined in the appended claims.

LIST OF REFERENCE SIGNS

Part of the description

1 composite rope
2 individual ropes of the composite rope 1
3 jacket of the individual ropes 2
4 tension member
5 connecting layer
6 traction sheave
7 grooves of the traction sheave
8 composite rope with rear profile
9 ribbed profile of the composite rope 8
10 longitudinal ribs of the composite rope 8

What is claimed is:

1. A traction system comprising:

at least one traction sheave having grooves;

at least one composite rope having individual ropes arranged in parallel;

said individual ropes each having a first diameter (d) and each being jacketed with an elastomer jacket layer of a predetermined thickness (u) so as to provide tension members, each member having an overall diameter;

said tension members each having: a first side; a second side facing away from said first side and said grooves of said traction sheave; and, a predetermined length;

said tension members being configured to engage in corresponding ones of said grooves of said traction sheave at said first side;

an elastomer connecting layer connecting said tension members to each other over substantially an entirety of said length of said tension members;

said elastomer connecting layer being arranged only on said second side of each of said tension members;

said tension members being configured to engage in corresponding ones of said grooves of said traction sheave with a penetration depth of at least 25% of said diameter (d) of said individual ropes;

said elastomer jacket layer of said individual ropes at said first side having a thickness (u) lying in a range of 0.2 mm to 2 mm; and, said elastomer connecting layer having a width that is smaller than an overall width of said composite rope.

2. The traction system of claim 1, wherein said elastomer jacket layer of said individual ropes has an outer contour facing said traction sheave; and, said outer contour has a cross-section which deviates from a partial circular form.

3. The traction system of claim 2, wherein said cross-section of said outer contour is of trapezoidal shape.

4. The traction system of claim 2, wherein said cross-section of said outer contour is of square shape.

5. The traction system of claim 2, wherein said cross-section of said outer contour is of conical shape.

6. The traction system of claim 1, wherein said thickness (u) of said elastomer jacket layer of said individual ropes is in a range of 0.5 mm to 1 mm.

7. The traction system of claim 1, wherein said diameter (d) of said individual ropes is between 1.5 mm and 8 mm.

8. The traction system of claim 1, wherein said diameter (d) of said individual ropes is between 1.8 mm and 5.5 mm.

9. The traction system of claim 1, wherein the ratio (d/u) between said diameter (d) of said individual ropes and said thickness (u) of said elastomer jacket layer is at least 3.

10. The traction system of claim 1, wherein at least one of said elastomer jacket layer and said elastomer connecting layer is polyurethane.

11. The traction system of claim 1, wherein said elastomer connecting layer has a side facing away from said traction sheave and has a profiled surface on said side facing away from said traction sheave.

12. The traction system of claim 1, wherein said composite rope has at least four individual ropes.

13. The traction system of claim 1, wherein said individual ropes are arranged alternately with an S-lay and a Z-lay.

14. The traction system of claim 1, wherein said composite rope has an even number of individual ropes.

15. The traction system of claim 1, wherein said individual ropes are made of steel.

16. The traction system of claim 1, wherein a ratio of (d/u) between said diameter (d) of said individual ropes and said thickness (u) of said elastomer jacket layer lies in a range of $0.75 \le (d/u) \le 40$.

17. The traction system of claim 1, wherein a ratio of (d/u) between said diameter (d) of said individual ropes and said thickness (u) of said elastomer jacket layer lies in a range of $2.5 \le (d/u) \le 10$.

18. The traction system of claim 1, wherein said elastomer connecting layer is arranged on said second side entirely above an imaginary line drawn through the respective centers of said ropes.

19. A traction system comprising:

at least one traction sheave having grooves;

at least one composite rope having individual ropes arranged in parallel;

said individual ropes each having a first diameter (d) and each being jacketed with an elastomer jacket layer of a predetermined thickness (u) so as to provide tension members, each member having an overall diameter;

said tension members each having: a first side; a second side facing away from said first side and said grooves of said traction sheave; and, a predetermined length;

said tension members being configured to engage in corresponding ones of said grooves of said traction sheave at said first side;

an elastomer connecting layer connecting said tension members to each other over substantially an entirety of said length of said tension members;

said elastomer connecting layer being arranged only on said second side of each of said tension members;

said tension members being configured to engage in corresponding ones of said grooves of said traction sheave with a penetration depth of at least 25% of said diameter (d) of said individual ropes;

said elastomer jacket layer being formed from a different elastomer than said elastomer connecting layer;

said elastomer jacket layer of said individual ropes at said first side having a thickness (u) lying in a range of 0.2 mm to 2 mm; and, said elastomer connecting layer having a width that is smaller than an overall width of said composite rope.

20. An elevator arrangement comprising:

an elevator;

a traction system connected to said elevator; and, said traction system including:

at least one traction sheave having grooves;

at least one composite rope having individual ropes arranged in parallel;

said individual ropes each having a first diameter (d) and each being jacketed with an elastomer jacket layer of a predetermined thickness (u) so as to provide tension members, each member having an overall diameter;

said tension members each having: a first side; a second side facing away from said first side and said grooves of said traction sheave; and, a predetermined length;

said tension members being configured to engage in corresponding ones of said grooves of said traction sheave at said first side;

an elastomer connecting layer connecting said tension members to each other over substantially an entirety of said length of said tension members;

said elastomer connecting layer being arranged only on said second side of each of said tension members;

said tension members being configured to engage in corresponding ones of said grooves of said traction sheave with a penetration depth of at least 25% of said diameter (d) of said individual ropes;

said elastomer jacket layer of said individual ropes at said first side having a thickness (u) lying in a range of 0.2 mm to 2 mm; and, said elastomer connecting layer having a width that is smaller than an overall width of said composite rope.

21. A traction system comprising:

at least one traction sheave having grooves;

at least one composite rope having individual ropes arranged in parallel;

said individual ropes each having a first diameter (d) and each being jacketed with an elastomer jacket layer of a predetermined thickness (u) so as to provide tension members, each of said tension members having an overall diameter;

said tension members each having: a first side; a second side facing away from said first side and said grooves of said traction sheave; and, a predetermined length;

said tension members being configured to engage in corresponding ones of said grooves of said traction sheave at said first side;

an elastomer connecting layer connecting said tension members to each other over substantially an entirety of said length of said tension members;

said elastomer connecting layer being arranged only on said second side of each of said tension members;

said tension members being configured to engage in corresponding ones of said grooves of said traction sheave with a penetration depth of at least 25% of said diameter (d) of said individual ropes; and, each of said elastomer jacket layers being arranged concentrically around respective ones of said individual ropes, wherein each of said jacket layers and the rope corresponding thereto conjointly define said overall diameter.

* * * * *